US008676463B2

(12) United States Patent
Okubo et al.

(10) Patent No.: US 8,676,463 B2
(45) Date of Patent: Mar. 18, 2014

(54) TRAVEL CONTROLLING APPARATUS OF VEHICLE

(75) Inventors: Ryosuke Okubo, Susono (JP); Hiroshi Kobayashi, Mishima (JP); Satoshi Suzuki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 399 days.

(21) Appl. No.: 13/060,179

(22) PCT Filed: Nov. 25, 2008

(86) PCT No.: PCT/JP2008/071326
§ 371 (c)(1),
(2), (4) Date: Feb. 22, 2011

(87) PCT Pub. No.: WO2010/061432
PCT Pub. Date: Jun. 3, 2010

(65) Prior Publication Data
US 2011/0264349 A1    Oct. 27, 2011

(51) Int. Cl.
*B60T 8/176*    (2006.01)

(52) U.S. Cl.
USPC ................. 701/71; 701/90; 303/163

(58) Field of Classification Search
USPC ............. 701/1, 70–75, 79–80, 83–83, 90–91; 180/197; 303/113.2, 121, 138, 139, 303/144, 149, 150, 151, 155, 163, 165–166
See application file for complete search history.

(56) References Cited

U.S. PATENT DOCUMENTS

| 4,778,223 A | * | 10/1988 | Inoue ........................... 303/166 |
| 4,850,656 A | * | 7/1989 | Ise et al. ....................... 303/192 |
| 5,082,081 A | * | 1/1992 | Tsuyama et al. .............. 180/197 |

(Continued)

FOREIGN PATENT DOCUMENTS

| CN | 1111449 A | 11/1995 |
| JP | A-5-85327 | 4/1993 |

(Continued)

OTHER PUBLICATIONS

Reply to Written Opinion of the International Searching Authority dated Aug. 20, 2010 in International Patent Application No. PCT/JP2008/071326 (with translation).

(Continued)

*Primary Examiner* — Thomas Black
*Assistant Examiner* — Ce Li
(74) *Attorney, Agent, or Firm* — Oliff PLC

(57) ABSTRACT

A travel controlling apparatus of a vehicle includes a slip ratio detecting unit that obtains a slip ratio of front wheels and rear wheels depending on a travel state of the vehicle, a friction coefficient detecting unit that obtains a friction coefficient of the front wheels and the rear wheels depending on the travel state of the vehicle, a slip ratio stable region setting unit that sets a slip ratio stable region in which the friction coefficient becomes a predetermined value or more depending on the travel state of the vehicle, a braking/driving force controlling unit that controls a braking/driving force in the slip ratio stable region, and a slip ratio stable region changing unit that changes an upper limit value and a lower limit value in the slip ratio stable region depending on a variation of the friction coefficient when the slip ratio increases and when the slip ratio decreases.

10 Claims, 8 Drawing Sheets

(56) References Cited

U.S. PATENT DOCUMENTS

| | | | |
|---|---|---|---|
| 5,176,444 A * | 1/1993 | Kageyama et al. | 303/163 |
| 5,224,766 A * | 7/1993 | Oikawa et al. | 303/148 |
| 5,425,574 A * | 6/1995 | Sano | 303/177 |
| 5,456,641 A * | 10/1995 | Sawase | 475/86 |
| 5,470,136 A * | 11/1995 | Tozu et al. | 303/147 |
| 5,474,368 A * | 12/1995 | Sano | 303/163 |
| 5,549,371 A * | 8/1996 | Konaga et al. | 303/152 |
| 5,654,887 A * | 8/1997 | Asa et al. | 701/22 |
| 5,662,393 A * | 9/1997 | Kamiya et al. | 303/194 |
| 5,788,342 A * | 8/1998 | Noguchi | 303/116.2 |
| 7,942,228 B2 * | 5/2011 | Fenker et al. | 180/265 |
| 2002/0167156 A1 | 11/2002 | Akutagawa et al. | 280/757 |
| 2003/0051544 A1 * | 3/2003 | Hong | 73/146 |
| 2003/0117015 A1 * | 6/2003 | Kuwajima et al. | 303/150 |
| 2004/0094342 A1 * | 5/2004 | Kowatari et al. | 180/65.2 |
| 2005/0012386 A1 * | 1/2005 | Nakano et al. | 303/114.1 |
| 2006/0012245 A1 * | 1/2006 | Post et al. | 303/154 |
| 2006/0108170 A1 * | 5/2006 | Ishikawa et al. | 180/282 |
| 2007/0114839 A1 * | 5/2007 | Ito et al. | 303/15 |
| 2007/0132311 A1 * | 6/2007 | Giazotto | 303/126 |
| 2007/0142996 A1 * | 6/2007 | Lee | 701/96 |
| 2008/0154472 A1 * | 6/2008 | Okuda et al. | 701/93 |
| 2008/0264709 A1 * | 10/2008 | Fenker et al. | 180/197 |
| 2009/0184572 A1 * | 7/2009 | Yamada et al. | 303/140 |

FOREIGN PATENT DOCUMENTS

| | | |
|---|---|---|
| JP | A-2000-503277 | 3/2000 |
| JP | A-2003-160044 | 6/2003 |
| JP | A-2007-145075 | 6/2007 |
| JP | A-2007-245767 | 9/2007 |
| JP | A-2010-95098 | 4/2010 |
| WO | WO 95/00355 A1 | 1/1995 |
| WO | WO 97/27092 | 7/1997 |

OTHER PUBLICATIONS

International Search Report dated Jan. 27, 2009 in International Patent Application No. PCT/JP2008/071326 (with translation).

* cited by examiner

TRAVEL CONTROLLING APPARATUS OF VEHICLE

TECHNICAL FIELD

The present invention relates to a travel controlling apparatus of a vehicle which controls a braking force and a driving force of the vehicle based on a slip ratio and a friction coefficient between a wheel mounted on the vehicle and a road surface.

BACKGROUND ART

Conventionally, there are known a so-called antilock brake system and a traction control system which adjust, when a drive wheel slips due to a brake pedal depression operation (braking operation) and an accelerator pedal depression operation (acceleration operation) performed by a driver, a braking force of the drive wheel in a slip state and an engine output, and applies an optimum driving force to the drive wheel.

For example, in the conventional antilock brake system, a control is performed so that a brake is applied in a region in which a brake friction coefficient becomes a predetermined value or more based on a relationship between a slip ratio and a brake friction coefficient of a wheel. In the characteristics of a slip ratio and a brake friction coefficient of a wheel, in general, when the slip ratio increases from 0%, the brake friction coefficient also increases and becomes a maximum value at a certain slip ratio, and thereafter the slip ratio decreases up to 100%. When the slip ratio decreases from 100%, the brake friction coefficient increases and becomes a maximum value at a certain slip ratio, and thereafter the slip ratio decreases up to 0%. In this case, it is known that when the slip ratio increases and when the slip ratio decreases, the brake friction coefficient increases and decreases through an approximately same path.

Accordingly, in a conventional brake control, an upper limit value and a lower limit value of the slip ratio is set in a stable region in which the brake friction coefficient becomes a predetermined value or more, the slip ratio is monitored in a travel state of a vehicle, and a brake fluid pressure of a brake device is controlled so that the slip ratio does not exceed the upper limit value and the lower limit value of the slip ratio. Accordingly, when the driver applies brake suddenly, the slip ratio can be kept in the stable region, that is, between the upper limit value and the lower limit value, and thus a shortest stop distance can be secured.

Note that the technology described above is described in the following patent documents 1 and 2.

Patent Document 1: Japanese Patent Application Laid-open No. 2007-245767
Patent Document 2: Japanese Patent Application Laid-open No. 2007-145075

DISCLOSURE OF INVENTION

Problems to be Solved by the Invention

However, in the characteristics of the wheel slip ratio and the brake friction coefficient, when the slip ratio increases and when the slip ratio decreases, although the brake friction coefficient increases and decreases through the approximately same path, according to various experiments performed by the inventors, since the path varies depending on a specific travel state of a vehicle, it is desired to further reduce a braking distance making use of the variation.

In consideration of the variation of the path, an object of the present invention is to provide a travel controlling apparatus of a vehicle which can improve safety by permitting a braking distance in the vehicle to be reduced.

Means for Solving Problem

In order to solve the above mentioned problem and achieve the object, a travel controlling apparatus of a vehicle according to the present invention includes a slip ratio detecting means that obtains a slip ratio of a wheel depending on a travel state of a vehicle; a friction coefficient detecting means that obtains a friction coefficient of the wheel depending on the travel state of the vehicle; a braking/driving force controlling means that controls a braking/driving force in a predetermined slip ratio stable region in which the friction coefficient becomes a preset predetermined value or more; and a slip ratio stable region changing means that changes at least any one of an upper limit value or a lower limit value in the slip ratio stable region depending on a variation of the friction coefficient when the slip ratio increases and when the slip ratio decreases.

The travel controlling apparatus of the vehicle according to the present invention includes a wheel input parameter detecting means that detects an input parameter acting on the wheel, wherein the upper limit value or the lower limit value in the slip ratio stable region is set depending on an input parameter of the wheel detected by the wheel input parameter detecting means.

In the travel controlling apparatus of the vehicle according to the present invention, the wheel input parameter detecting means detects a ground contact load, a vehicle speed, and a change rate of a slip ratio as the input parameter acting on the wheel.

In the travel controlling apparatus of the vehicle according to the present invention, when the friction coefficient at the time the slip ratio decreases exceeds the friction coefficient at the time the slip ratio increases, the slip ratio stable region changing means changes a lower limit value in the slip ratio stable region to a decreasing side.

In the travel controlling apparatus of the vehicle according to the present invention, when the friction coefficient at the time the slip ratio decreases exceeds the friction coefficient at the time the slip ratio increases, the slip ratio stable region changing means changes a lower limit value in the slip ratio stable region to a preset corrected lower limit value.

In the travel controlling apparatus of the vehicle according to the present invention, when the friction coefficient at the time the slip ratio decreases exceeds the friction coefficient at the time the slip ratio increases, the slip ratio stable region changing means changes a lower limit value in the slip ratio stable region to the slip ratio corresponding to a maximum value of the friction coefficient.

In the travel controlling apparatus of the vehicle according to the present invention, the slip ratio stable region changing means determines whether or not an upper limit value and a lower limit value in the slip ratio stable region are changed depending on an input parameter acting on the wheel.

Effect of the Invention

According to the travel controlling apparatus of the vehicle of the present invention, a braking/driving force can be controlled in a predetermined slip ratio stable region in which a friction coefficient becomes a preset predetermined value or more, and at least any one of an upper limit value or a lower limit value in the slip ratio stable region is changed depending on a variation of the friction coefficient when the slip ratio increases and when the slip ratio decreases. Accordingly, safety can be improved by permitting a braking distance in the vehicle to be reduced by applying an optimum friction coefficient when the slip ratio increases and when the slip ratio decreases.

EXPLANATION OF LETTERS OR NUMERALS

Figure 1:
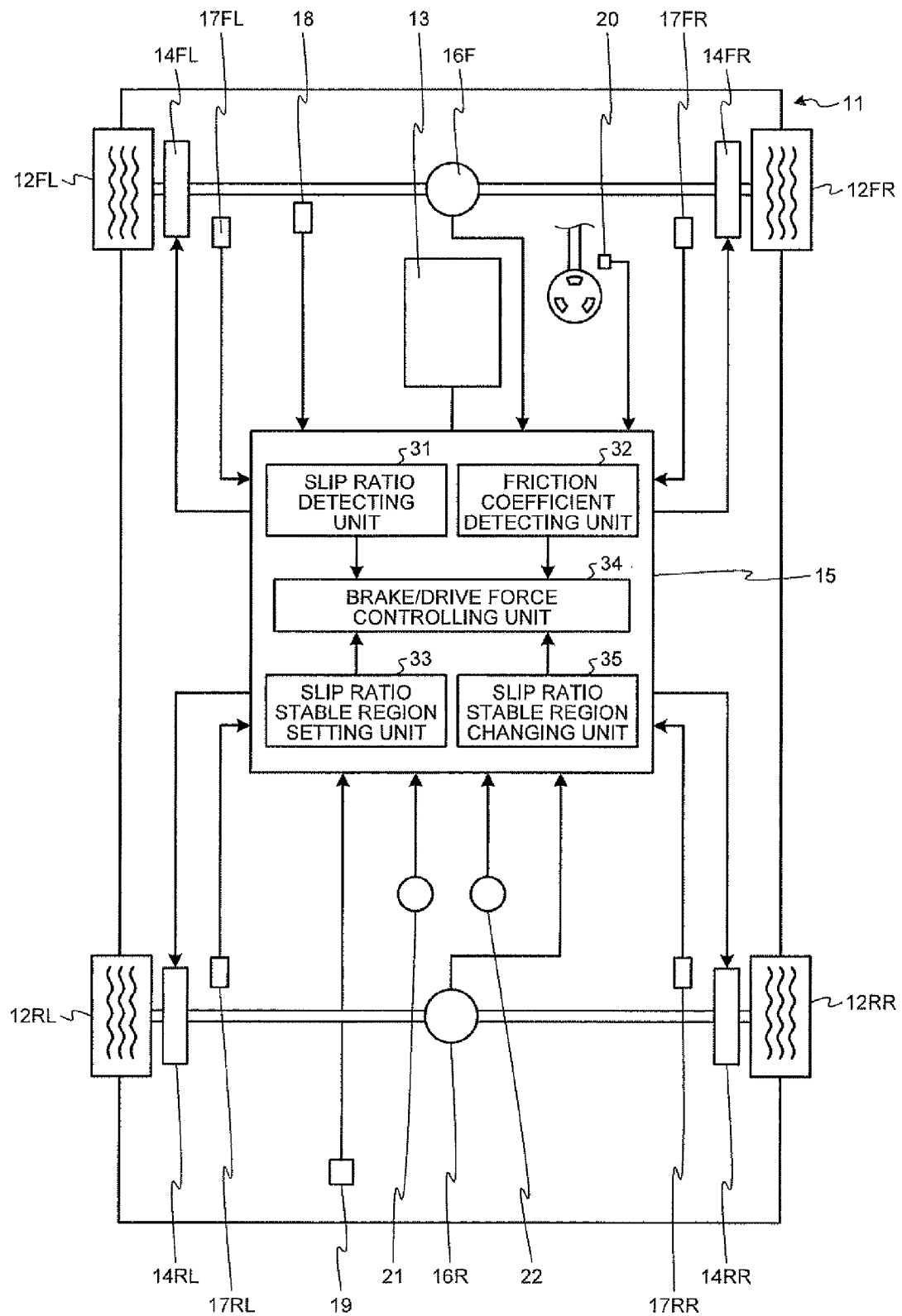
FIG. 1 is a schematic configuration view showing a travel controlling apparatus of a vehicle according to a first embodiment of the present invention.

11 Vehicle
12FL, 12FR Front wheel
12RL, 12RR Rear wheel
13 Engine
14FL, 14FR, 14RL, 14RR Hydraulic pressure brake device
15 Electronic control unit (ECU)
16F, 16R Wheel weight sensor (wheel input parameter detecting means)
17FL, 17FR, 17RL, 17RR Wheel speed sensor
18 Vehicle speed sensor (wheel input parameter detecting means)
21 Front/rear acceleration sensor
22 Lateral acceleration sensor
31 Slip ratio detecting unit
32 Friction coefficient detecting unit
33 Slip ratio stable region setting unit
34 Braking/driving force controlling unit
35 Slip ratio stable region changing unit

BEST MODE(S) FOR CARRYING OUT THE INVENTION

Hereinafter, embodiments of a travel controlling apparatus of a vehicle according to the present invention will be explained in detail based on the drawings. Note that the present invention is not limited by the embodiments.

First Embodiment

Figure 2:
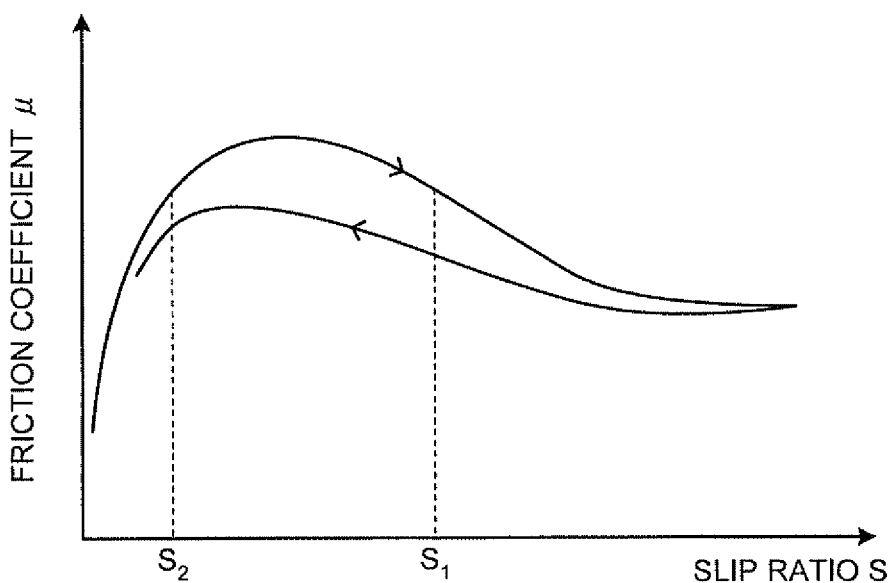
FIG. 2 is a graph showing a brake friction coefficient to a slip ratio.
Figure 3:
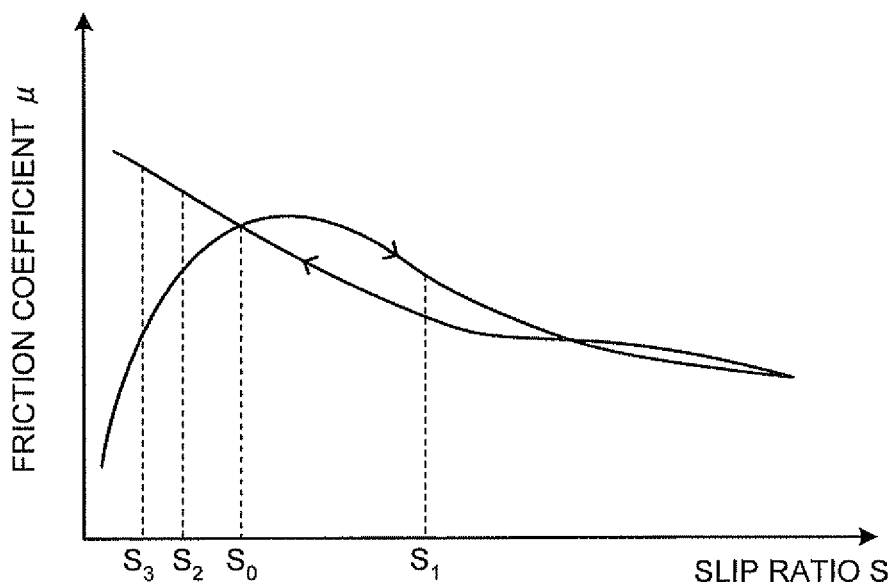
FIG. 3 is a graph showing a brake friction coefficient to a slip ratio.
Figure 4:
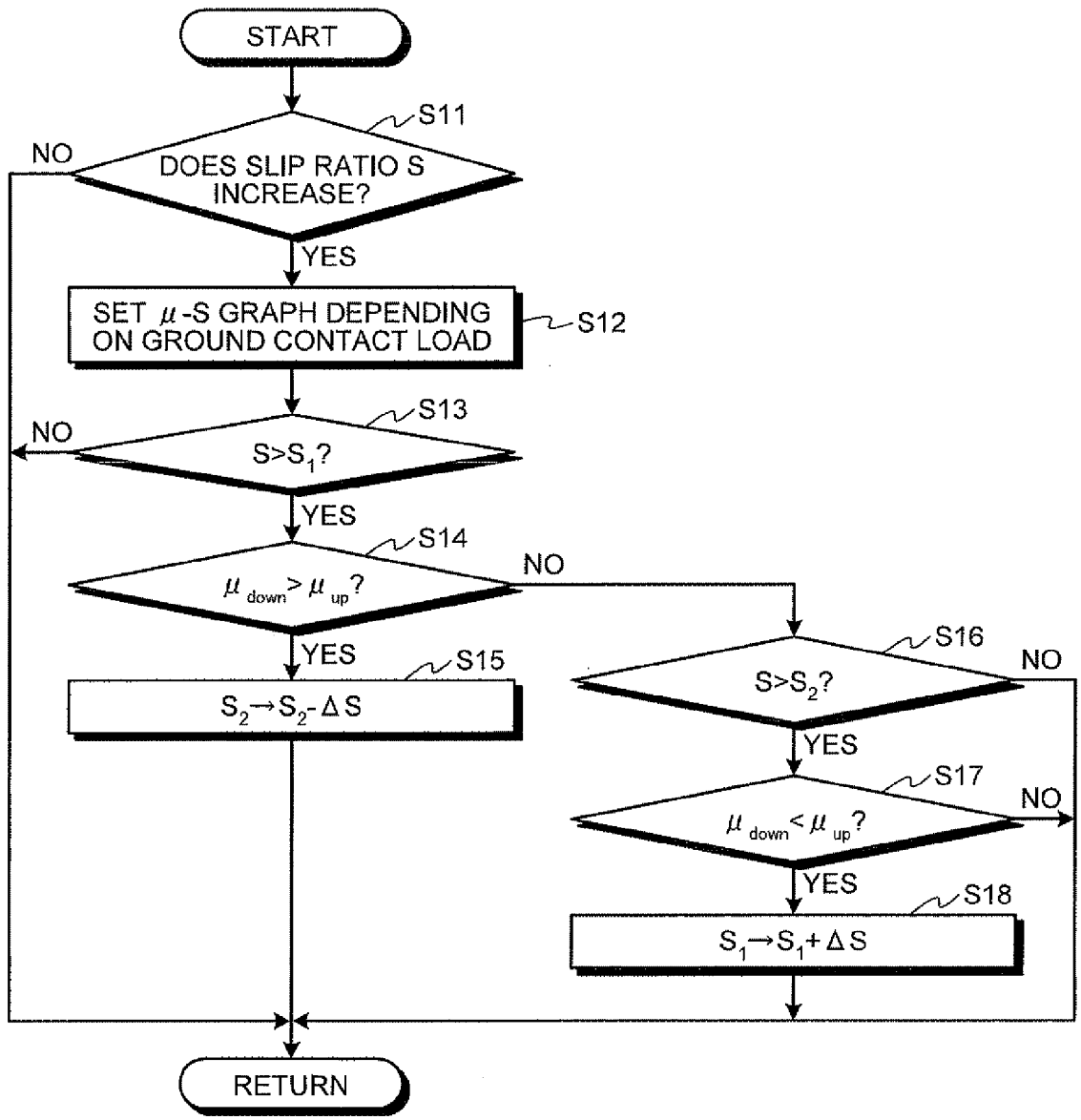
FIG. 4 is a flowchart showing a brake control in the travel controlling apparatus of the vehicle of the first embodiment.

FIG. 1 is a schematic configuration view showing a travel controlling apparatus of a vehicle according to a first embodiment of the present invention, FIG. 2 and FIG. 3 are graphs showing brake friction coefficients to slip ratios, and FIG. 4 is a flowchart showing a brake control in the travel controlling apparatus of the vehicle of the first embodiment.

In the travel controlling apparatus of the vehicle of the first embodiment, as shown in FIG. 1, a vehicle 11 includes front wheels 12FL, 12FR and rear wheels 12RL, 12RR and can be driven by an engine (internal combustion engine) 13. Further, the front wheels 12FL, 12FR and the rear wheels 12RL, 12RR are disposed with hydraulic pressure brake devices 14FL, 14FR, 14RL, 14RR. An electronic control unit (ECU) 15 can control the engine 13 and the hydraulic pressure brake devices 14FL, 14FR, 14RL, 14RR and controls the engine 13 and the hydraulic pressure brake devices 14FL, 14FR, 14RL, 14RR depending on a travel state of the vehicle 11 in addition to an accelerator pedal operation and a brake pedal operation of a driver.

Further, the vehicle 11 is mounted with various types of sensors which detect its travel state. Wheel weight sensors (for example, load cells) 16F, 16R are disposed in front of and behind the vehicle 11 to measure weights of the front wheels 12FL, 12FR and the rear wheels 12RL, 12RR. The vehicle 11 is disposed with wheel speed sensors 17FL, 17FR, 17RL, 17RR which detect rotation speeds of the front wheels 12FL, 12FR and the rear wheels 12RL, 12RR. The vehicle 11 is disposed with a vehicle speed sensor 18 which detects its travel speed as well as disposed with a stop lamp switch 19 which is turned ON/OFF depending on the brake pedal operation. The vehicle 11 is disposed with a steering angle sensor 20 which detects a steering angle of a steering unit. Further, the vehicle 11 is disposed with a front/rear acceleration sensor 21 which detects a front/rear acceleration acting on the vehicle 11 as well as is disposed with a lateral acceleration sensor 22 which detects a lateral (right/left) acceleration acting on the vehicle 11.

The ECU 15 is input with results detected by the wheel weight sensors 16F, 16R, the wheel speed sensors 17FL, 17FR, 17RL, 17RR, the vehicle speed sensor 18, the stop lamp switch 19, the steering angle sensor 20, the front/rear acceleration sensor 21, and the lateral acceleration sensor 22, and controls the engine 13 and the hydraulic pressure brake devices 14FL, 14FR, 14RL, 14RR based on the results of detection of the various types of the sensors.

The travel controlling apparatus of the vehicle of the first embodiment includes a slip ratio detecting unit 31 which determines a slip ratio S between the front wheels 12FL, 12FR and the rear wheels 12RL, 12RR and a road surface depending on the travel state of the vehicle 11, a friction coefficient detecting unit 32 which determines a friction coefficient μ between the front wheels 12FL, 12FR and the rear wheels 12RL, 12RR and the road surface depending on the travel state of the vehicle 11, a slip ratio stable region setting unit 33 which sets a predetermined slip ratio stable region in which the friction coefficient μ becomes a preset predetermined value or more depending on the travel state of the vehicle 11, a braking/driving force controlling unit 34 which controls a braking/driving force in the set slip ratio stable region, and a slip ratio stable region changing unit 35 which changes at least any one of an upper limit value or a lower limit value in the slip ratio stable region depending on a variation of the friction coefficient when the slip ratio increases and when the slip ratio decreases.

Note that, in the embodiment, the slip ratio detecting unit 31, the friction coefficient detecting unit 32, the slip ratio stable region setting unit 33, the braking/driving force controlling unit 34, and the slip ratio stable region changing unit 35 are composed by of the ECU 15.

In this case, the slip ratio detecting unit 31 calculates the slip ratio S using the following expression based on a travel speed V of the vehicle 11 detected by the vehicle speed sensor 18 and a rotation speed Vw of the front wheels 12FL, 12FR and the rear wheels 12RL, 12RR detected by the wheel speed sensors 17FL, 17FR, 17RL, 17RR. Note that the rotation speed Vw is an average value of the values detected by the wheel speed sensors 17FL, 17FR, 17RL, 17RR.

$$S=[(V-Vw)/V]\times 100$$

Further, the friction coefficient detecting unit 32 calculates the friction coefficient μ using the following expression based on a front/rear force Fx and a ground contact load Fz acting on the front wheels 12FL, 12FR and the rear wheels 12RL, 12RR. Note that the front/rear force Fx is estimated based on the rotation speed Vw of the front wheels 12FL, 12FR and the rear wheels 12RL, 12RR detected by the wheel speed sensors 17FL, 17FR, 17RL, 17RR or estimated depending on a braking force and a driving force of the vehicle 11. In contrast, the weights of the front wheels 12FL, 12FR and the rear wheels 12RL, 12RR detected by the wheel weight sensors 16F, 16R are applied to the ground contact load Fz.

$$\mu=Fx/Fz$$

Further, the slip ratio stable region setting unit 33 employs the ground contact load Fz of the front wheels 12FL, 12FR and the rear wheels 12RL, 12RR as a wheel input parameter detecting means which detects an input parameter acting on the front wheels 12FL, 12FR and the rear wheels 12RL, 12RR, and the ground contact load Fz is detected by the wheel weight sensors 16F, 16R described above. That is, the slip ratio stable region setting unit 33 has a map showing many slip ratio-friction coefficient graphs (hereinafter, called a μ-S graph) depending on the ground contact load Fz of the front wheels 12FL, 12FR and the rear wheels 12RL, 12RR, an optimum μ-S graph (map) is selected depending on the ground contact load Fz when the vehicle 11 travels, and an upper limit value $S_1$ and a lower limit value $S_2$ are set in the slip ratio stable region.

When the friction coefficient μ at the time the slip ratio S decreases exceeds the friction coefficient μ at the time the slip ratio S increases, the slip ratio stable region changing unit 35 changes the lower limit value $S_2$ in the slip ratio stable region to a decreasing side.

In this case, when the friction coefficient μ at the time the slip ratio S decreases exceeds the friction coefficient μ at the time the slip ratio S increases, the lower limit value $S_2$ in the slip ratio stable region is changed to a preset corrected lower limit value $S_3$. Otherwise, when the friction coefficient μ at the time the slip ratio S decreases exceeds the friction coefficient μ at the time the slip ratio S increases, the lower limit value $S_2$ in the slip ratio stable region is changed to a slip ratio $S_3$ corresponding to a maximum value (peak value) of the friction coefficient μ.

To explain the above-mentioned specifically, in a braking/drive control of the vehicle 11, a control is performed so that the vehicle 11 is driven and braked in the slip ratio stable region, in which the friction coefficient μ becomes the predetermined value or more, based on a relationship between the slip ratio S and the friction coefficient μ of the wheels (front wheels 12FL, 12FR and rear wheels 12RL, 12RR). In the characteristics of the slip ratio S and the friction coefficient μ of the wheels, when the slip ratio S increases from 0%, the friction coefficient μ also increases, has a maximum value at a certain slip ratio S, and thereafter decreases until the slip ratio S becomes 100%. In contrast, when the slip ratio S decreases from 100%, the friction coefficient increases, has a maximum value at a certain slip ratio S, and thereafter decreases until the slip ratio S becomes 0%.

In this case, as shown in FIG. 2, ordinarily, when the slip ratio S increases and when the slip ratio S decreases, the friction coefficient μ increases and decreases through an approximately same path, and the friction coefficient μ when the slip ratio S decreases becomes lower than the friction coefficient μ when the slip ratio S increases. Accordingly, the upper limit value $S_1$ and the lower limit value $S_2$ of the slip ratio S are set in the stable region in which the friction coefficient μ becomes the predetermined value or more, and the ECU 15 controls a brake hydraulic pressure of the hydraulic pressure brake devices 14FL, 14FR, 14RL, 14RR so that the slip ratio S does not exceed the upper limit value $S_1$ and the lower limit value $S_2$.

However, due to the characteristics of the slip ratio S and the friction coefficient μ, in a specific travel state of the vehicle 11, as shown in FIG. 3, although the friction coefficient μ increases and decreases through the approximately same path when the slip ratio S increases and when the slip ratio S decreases, a region is generated in which the friction coefficient μ when the slip ratio S decreases becomes equal to or higher than the friction coefficient μ when the slip ratio S increases. Accordingly, when the friction coefficient μ at the time the slip ratio S decreases is equal to or higher than the friction coefficient μ at the time the slip ratio S increases, the ECU 15 changes the lower limit value $S_2$ of the slip ratio S to the corrected lower limit value $S_3$ on the decreasing side and controls the brake hydraulic pressure of the hydraulic pressure brake devices 14FL, 14FR, 14RL, 14RR so that the slip ratio S does not exceed the upper limit value $S_1$ and the corrected lower limit value $S_3$.

A brake control in the travel controlling apparatus of the vehicle of the first embodiment will be explained in detail based on the flowchart of FIG. 4.

In the brake control in the travel controlling apparatus of the vehicle of the first embodiment, as shown in FIG. 2, at step S11, the ECU 15 determines whether or not a slip ratio S at the time increases when the vehicle 11 travels. That is, the ECU 15 determines whether or not the driver depresses a brake pedal and the front wheels 12FL, 12FR and the rear wheels 12RL, 12RR are being locked. When the slip ratio S does not increase, the ECU 15 determines that the driver does not depresses the brake pedal or even if the driver depresses the brake pedal, the front wheels 12FL, 12FR and the rear wheels 12RL, 12RR normally decreases a speed without being locked, and thus a process passes through the routine without performing anything.

In contrast, when the ECU 15 determines that the slip ratio S increases, at step S12, a μ-S graph is set depending on a ground contact load, and the ECU 15 determines at step S13 whether or not the slip ratio S which increases at the time exceeds the upper limit value $S_1$ in the slip ratio stable region prescribed by the set μ-S graph. When the ECU 15 determines that the slip ratio S at the time does not exceed the upper limit value $S_1$, the process passes through the routine without performing anything. In contrast, when the ECU 15 determines that the slip ratio S at the time exceeds the upper limit value $S_1$, since the front wheels 12FL, 12FR and the rear wheels 12RL, 12RR are being locked, the ECU 15 releases the brake hydraulic pressure of the hydraulic pressure brake devices 14FL, 14FR, 14RL, 14RR by a not shown control routine.

Since the front wheels 12FL, 12FR and the rear wheels 12RL, 12RR in the vehicle 11 are unlocked, the slip ratio S at the time begins to decrease. At step S14, the ECU 15 determines whether or not a friction coefficient $\mu_{down}$ when the slip ratio S decreases is equal to or higher than a friction coefficient $\mu_{up}$ when the slip ratio S increases just before the decrease of the slip ratio S.

When the ECU 15 determines that the friction coefficient $\mu_{down}$ at the time the slip ratio S decreases is equal to or higher than the friction coefficient $\mu_{up}$ at the time the slip ratio S increases, at step S15, the lower limit value $S_2$ in the slip ratio stable region prescribed by the set μ-S graph is changed to the corrected lower limit value $S_3$ ($S_2 - \Delta S$) previously set to the decreasing side.

In contrast, at step S14, when the ECU 15 determines that the friction coefficient $\mu_{down}$ at the time the slip ratio S decreases is lower than the friction coefficient $\mu_{up}$ at the time the slip ratio S increases just before the decrease of the slip ratio S, at step S16, the ECU 15 determines whether or not the slip ratio S which decreases at the time exceeds the lower limit value $S_2$ in the slip ratio stable region prescribed by the set μ-S graph or the changed corrected lower limit value $S_3$ without changing the lower limit value $S_2$ in the slip ratio stable region. When the ECU 15 determines that the slip ratio S at the time does not exceed the lower limit value $S_2$ (or the corrected lower limit value $S_3$), the process passes through the routine without performing anything. In contrast, when the ECU 15 determines that the slip ratio S at the time exceeds the lower limit value $S_2$ (or the corrected lower limit value $S_3$), since the front wheels 12FL, 12FR and the rear wheels 12RL, 12RR are recovering their rotation, the ECU 15 increases the brake hydraulic pressure of the hydraulic pressure brake devices 14FL, 14FR, 14RL, 14RR by a not shown control routine.

Since the front wheels 12FL, 12FR and the rear wheels 12RL, 12RR in the vehicle 11 are braked, the slip ratio S at the time begins to increase. At step S17, the ECU 15 determines whether or not the friction coefficient $\mu_{up}$ when the slip ratio S increases is equal to or higher than the friction coefficient $\mu_{down}$ when the slip ratio S decreases just before the increase of the slip ratio S. When the ECU 15 determines that the friction coefficient $\mu_{up}$ at the time the slip ratio S increases is equal to or higher than the friction coefficient $\mu_{down}$ down at the time the slip ratio S decreases, at step S18, the upper limit value $S_1$ in the slip ratio stable region prescribed by the set μ-S graph is changed to a corrected upper limit value $S_4$ ($S_1 + \Delta S$) preset to an increase side.

Note that, at step S15 described above, although the corrected lower limit value $S_3$ is set by subtracting the preset correction value $\Delta S$ from the lower limit value $S_2$ in the slip ratio stable region prescribed by the μ-S graph, a method of setting the corrected lower limit value $S_3$ is not limited to the method described above. For example, when the friction coefficient $\mu_{down}$ of the slip ratio S increases and the slip ratio S becomes equal to or higher than the friction coefficient $\mu_{up}$, the slip ratio S corresponding to a maximum value (peak value) of the friction coefficient $\mu_{down}$ may be set as the corrected lower limit value $S_3$. Specifically, the slip ratio S when a change rate ($d\mu_{down}/dS$) of the friction coefficient $\mu_{down}$ becomes 0 at the time the slip ratio S decreases is set as the corrected lower limit value $S_3$. In this case, any one of the two setting method described above may be employed. Further, the processing at step S18 described above is also the same.

As described above, the travel controlling apparatus of the vehicle of the first embodiment is disposed with the slip ratio detecting unit 31 which determines the slip ratio S between the front wheels 12FL, 12FR and the rear wheels 12RL, 12RR and the road surface depending on the travel state of the vehicle 11, the friction coefficient detecting unit 32 which determines the friction coefficient μ between the front wheels 12FL, 12FR and the rear wheels 12RL, 12RR and the road surface depending on the travel state of the vehicle 11, the slip ratio stable region setting unit 33 which sets the predetermined slip ratio stable region in which the friction coefficient μ becomes the preset predetermined value or more depending on the travel state of the vehicle 11, the braking/driving force controlling unit 34 which controls the braking/driving force in the set slip ratio stable region, and the slip ratio stable region changing unit 35 which changes at least any one of the upper limit value $S_1$ or the lower limit value $S_2$ in the slip ratio stable region depending on the variation of the friction coefficient μ when the slip ratio S increases and when the slip ratio S decreases.

Accordingly, since it is possible to apply an optimum friction coefficient μ depending on the travel state of the vehicle 11 by changing the upper limit value $S_1$ and the lower limit value $S_2$ in the slip ratio stable region depending on the variation of the friction coefficient μ when the slip ratio S increases and when the slip ratio S decreases, safety can be improved by permitting a braking distance in the vehicle 11 to be reduced.

Further, in the travel controlling apparatus of the vehicle of the first embodiment, the slip ratio stable region setting unit 33 employs the ground contact load Fz of the front wheels 12FL, 12FR and the rear wheels 12RL, 12RR as the wheel input parameter detecting means which detects the input parameter acting on the front wheels 12FL, 12FR and the rear wheels 12RL, 12RR, selects an optimum slip ratio-friction coefficient graph depending on the ground contact load Fz, and sets the upper limit value $S_1$ and the lower limit value $S_2$ in the slip ratio stable region. Accordingly, since the many slip ratio-friction coefficient graphs are prepared to the ground contact load Fz which varies depending on the travel state of the vehicle 11, that is, on a rotation state of the front wheels 12FL, 12FR and the rear wheels 12RL, 12RR, and sets the slip ratio stable region by selecting the optimum slip ratio-friction coefficient graph from the many graphs, a braking performance can be improved by applying an appropriate friction coefficient μ.

Further, in the travel controlling apparatus of the vehicle of the first embodiment, when the friction coefficient μ at the time the slip ratio S decreases exceeds the friction coefficient μ at the time the slip ratio S increases, the slip ratio stable region changing unit 35 changes the lower limit value $S_2$ in the slip ratio stable region to the decreasing side. Accordingly, the braking distance can be reduced by applying a favorable friction coefficient μ.

Further, in the travel controlling apparatus of the vehicle of the first embodiment, when the friction coefficient μ at the time the slip ratio S decreases exceeds the friction coefficient μ at the time the slip ratio S increases, the lower limit value $S_2$ in the slip ratio stable region is changed to the preset corrected lower limit value $S_3$. Accordingly, since the lower limit value $S_2$ can be easily changed to the corrected lower limit value $S_3$, the control can be simplified. Further, when the friction coefficient μ at the time the slip ratio S decreases exceeds the friction coefficient μ at the time the slip ratio S increases, the lower limit value $S_2$ in the slip ratio stable region is changed to the slip ratio $S_3$ corresponding to a maximum value of the friction coefficient μ. Accordingly, since the lower limit value $S_2$ can be appropriately changed to the corrected lower limit value $S_3$, an accuracy of the control can be increased.

Second Embodiment

Figure 5:
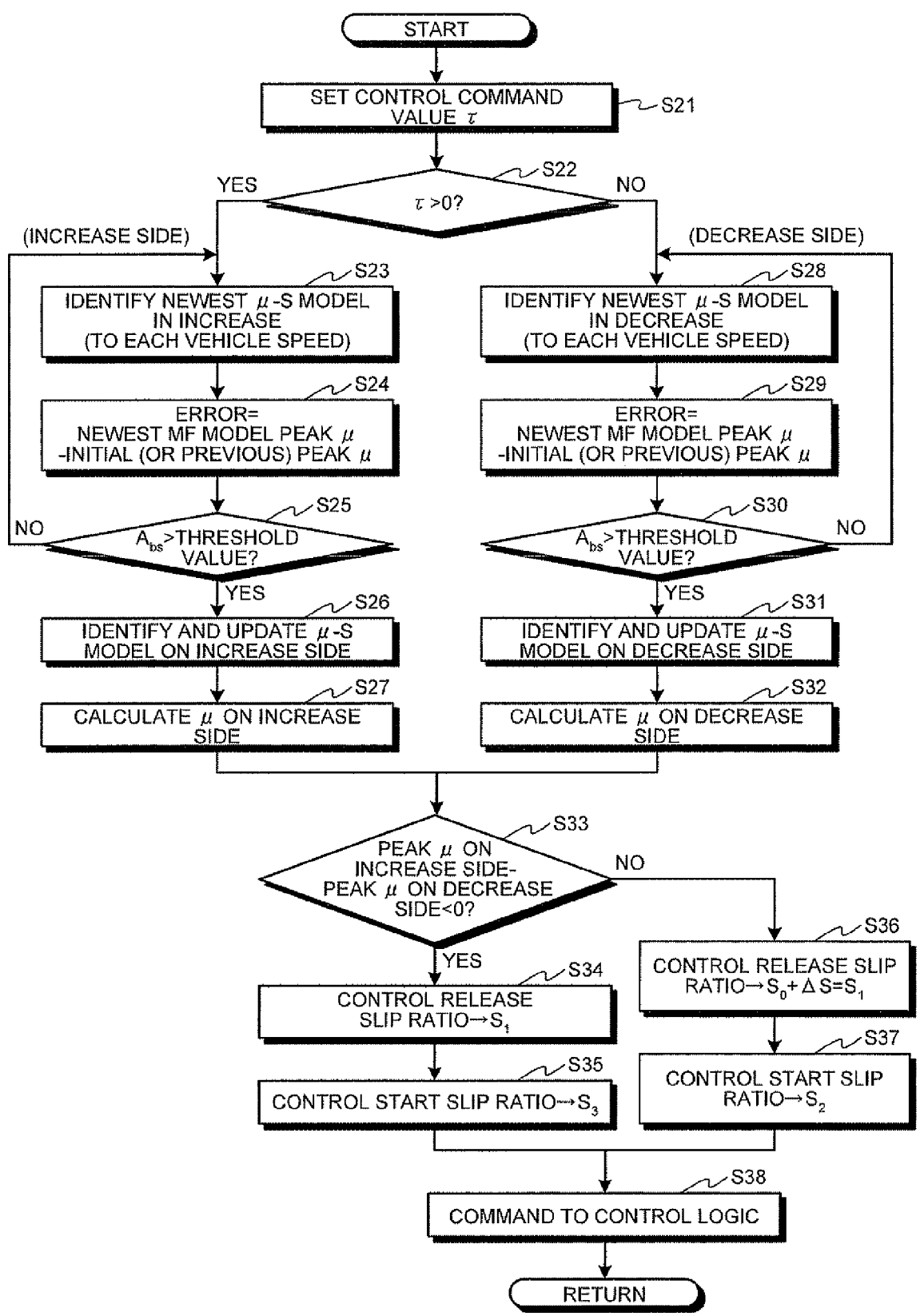
FIG. 5 is a flowchart showing a brake control in a travel controlling apparatus of a vehicle according to a second embodiment of the present invention.
Figure 6:
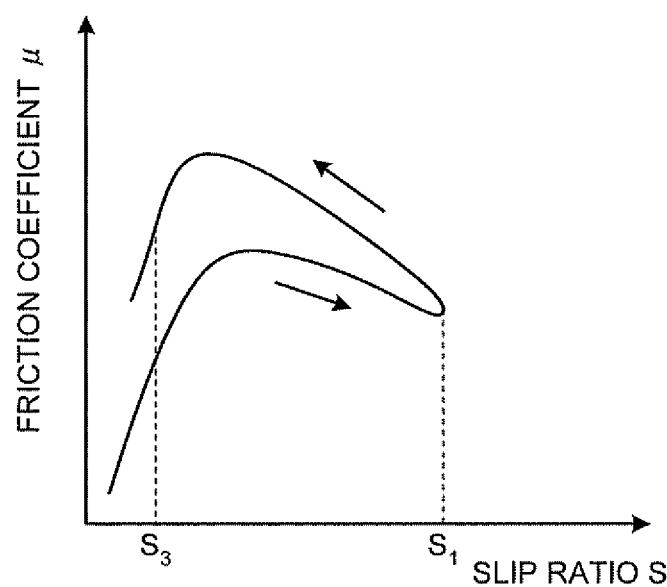
FIG. 6 is a graph showing a brake friction coefficient to a slip ratio.
Figure 7:
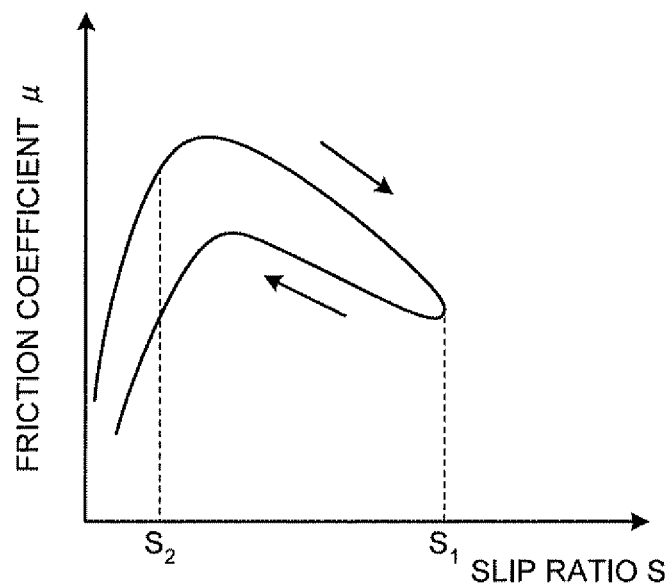
FIG. 7 is a graph showing a brake friction coefficient to a slip ratio.

FIG. 5 is a flowchart showing a brake control in a travel controlling apparatus of a vehicle according to a second embodiment of the present invention, and FIG. 6 and FIG. 7 show graphs showing brake friction coefficients to slip ratios. Note that since an overall configuration of the travel controlling apparatus of the vehicle of the present embodiment is approximately the same as the first embodiment described above, the travel controlling apparatus is explained using FIG. 1 as well as components which have the same functions as the components explained in the embodiment are denoted by the same reference numerals and duplicate explanation is omitted.

As shown in FIG. 1, the travel controlling apparatus of the vehicle of the second embodiment includes a slip ratio detecting unit 31 which determines a slip ratio S between front wheels 12FL, 12FR and rear wheels 12RL, 12RR and a road surface depending on a travel state of the vehicle 11, a friction coefficient detecting unit 32 which determines a friction coefficient μ between the front wheels 12FL, 12FR and the rear wheels 12RL, 12RR and the road surface depending on the travel state of the vehicle 11, a slip ratio stable region setting unit 33 which sets a predetermined slip ratio stable region in which the friction coefficient μ becomes a preset predetermined value or more depending on the travel state of the vehicle 11, a braking/driving force controlling unit 34 which controls a braking/driving force in a set slip ratio stable region, and a slip ratio stable region changing unit 35 which changes at least any one of an upper limit value or a lower limit value in the slip ratio stable region depending on a variation of the friction coefficient when the slip ratio increases and when the slip ratio decreases.

In the second embodiment, the slip ratio stable region setting unit 33 employs a travel speed (vehicle speed) V of the vehicle 11 as a wheel input parameter detecting means which detects an input parameter acting on front wheels 12FL, 12FR and rear wheels 12RL, 12RR, and the vehicle speed V is detected by a vehicle speed sensor 18. That is, the slip ratio stable region setting unit 33 has a map showing many slip ratio-friction coefficient graphs (μ-S graphs) depending on vehicle speeds V, an optimum μ-S graph (map) is selected depending on a vehicle speed V when the vehicle 11 travels, and an upper limit value $S_1$ and a lower limit value $S_2$ are set in the slip ratio stable region.

The brake control of the travel controlling apparatus of the vehicle of the second embodiment will be explained in detail based on the flowchart of FIG. 5.

In the brake control in the travel controlling apparatus of the vehicle of the second embodiment, as shown in FIG. 5, at step S21, an ECU 15 sets a control command value τ to hydraulic pressure brake devices 14FL, 14FR, 14RL, 14RR depending on the travel state of the vehicle 11. In this case, when a driver does not depress a brake pedal, the control command value τ is 0, when the driver depresses the brake pedal as well as the front wheels 12FL, 12FR and the rear wheels 12RL, 12RR are not locked, the control command value τ is on a positive side, and when the driver depresses the brake pedal as well as when the front wheels 12FL, 12FR and the rear wheels 12RL, 12RR are locked, the control command value τ is on a negative side.

At step S22, the ECU 15 determines whether or not the control command value τ is equal to or larger than 0. As described above, when the ECU 15 determines that the control command value τ is equal to or larger than 0, since the driver depresses the brake pedal and the front wheels 12FL, 12FR and the rear wheels 12RL, 12RR are not locked, a hydraulic pressure of the hydraulic pressure brake devices 14FL, 14FR, 14RL, 14RR increases and a slip ratio S increases. In contrast, when the ECU 15 determines that the control command value τ is less than 0, since the driver depresses the brake pedal and the front wheels 12FL, 12FR and the rear wheels 12RL, 12RR are locked, the hydraulic pressure of the hydraulic pressure brake devices 14FL, 14FR, 14RL, 14RR is released, and the slip ratio S decreases.

That is, when the ECU 15 determines that the control command value τ is equal to or larger than 0, processes at steps S23 to S27 are performed, whereas when the ECU 15 determines that the control command value τ is less than 0, processes at steps S28 to S32 are performed.

At step S23, the ECU 15 identifies a newest μ-S graph (model) when the slip ratio S increases to each vehicle speed V. When the μ-S graph (model) depending on the vehicle speed V cannot be identified at step S23, the ECU 15 calculates at step S24 an Error value by subtracting an initial (or previous) peak μ from a newest MF model peak μ and sets the Error value as an Abs value. At step S25, the ECU 15 determines whether or not the Abs value is equal to or larger than a threshold value, and when the ECU 15 determines that the Abs value is less than the threshold value, a process returns to step S23. In contrast, when the ECU 15 determines that the Abs value is equal to or larger than the threshold value, the ECU 15 identifies and updates the μ-S graph (model) when the slip ratio S increases depending on the vehicle speed V at the time at step S26. At step S27, a peak value of the friction coefficient μ when the slip ratio S increases and the slip ratio S at the time are calculated based on the μ-S graph (model).

Note that the μ-S graph (model) is a graph to which the Magic Formula (MF) model is applied and which updates an MF model coefficient each predetermined travel distance. Further, in the embodiment, the peak value of the friction coefficient μ and the slip ratio S are predicted and determined using the MF model coefficient. In this case, the travel state of the vehicle 11 at the time is predicted using a ground contact load Fz, a front/rear force Fx, a wheel speed Vw, and the vehicle speed V.

In contrast, also at steps S28 to S32, the peak value of the friction coefficient μ when the slip ratio S decreases and the slip ratio S at the time are calculated based on the μ-S graph (model) likewise.

At step S33, the peak value of the friction coefficient μ at the time the slip ratio S increases is compared with the peak value of the friction coefficient μ at the time the slip ratio S decreases. When the peak value of the friction coefficient μ at the time the slip ratio S decreases is larger than the peak value of the friction coefficient μ at the time the slip ratio S increases, since this is shown by the μ-S graph shown in FIG. 6, at step S34, a reference slip ratio $S_0$ is set to a control release slip ratio (upper limit value) $S_1$, and, at step S35, the reference slip ratio $S_0$ is changed to a control start slip ratio (lower limit value) $S_3$. In contrast, at step S33, when the peak value of the friction coefficient μ at the time the slip ratio S increases is larger than the peak value of the friction coefficient μ at the time the slip ratio S decreases, since this is shown by the μ-S graph shown in FIG. 7, at step S36, the reference slip ratio $S_0$ is added with a correction value ΔS and set to a control release slip ratio (upper limit value) $S_1$, and, at step S37, the reference slip ratio $S_0$ is set to a control start slip ratio (lower limit value) $S_2$.

When the control release slip ratio (upper limit value) and the control start slip ratio (lower limit value) are set at step S34 to S37, the ECU 15 outputs the control release slip ratio and the control start slip ratio to a control logic at step S38 and controls the hydraulic pressure brake devices 14FL, 14FR, 14RL, 14RR.

As described above, in the travel controlling apparatus of the vehicle of the second embodiment, the slip ratio stable region setting unit 33 employs the travel speed V of the vehicle 11 as the wheel input parameter detecting means which detects the input parameter acting on the front wheels 12FL, 12FR and the rear wheels 12RL, 12RR, selects an optimum slip ratio-friction coefficient graph depending on the vehicle speed V, and sets the upper limit value $S_1$ and the lower limit value $S_2$ in the slip ratio stable region. Accordingly, since the many slip ratio-friction coefficient graphs are prepared to the vehicle speed V which varies depending on the travel state of the vehicle 11, that is, on a rotation state of the front wheels 12FL, 12FR and the rear wheels 12RL, 12RR, and sets the slip ratio stable region by selecting the optimum slip ratio-friction coefficient graph from the many graphs, a braking performance can be improved by applying an appropriate friction coefficient µ.

Third Embodiment

Figure 8:
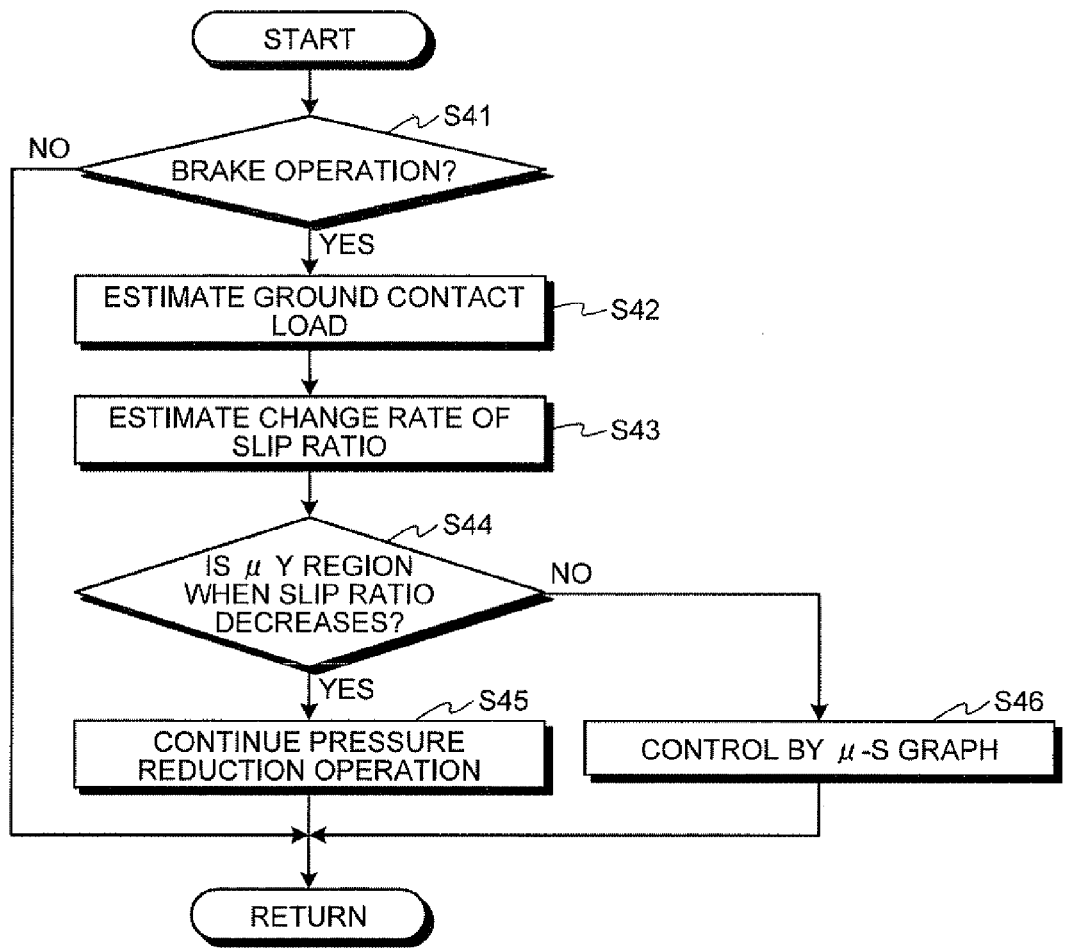
FIG. 8 is a flowchart showing a brake control in a travel controlling apparatus of a vehicle according to a third embodiment of the present invention.
Figure 9:
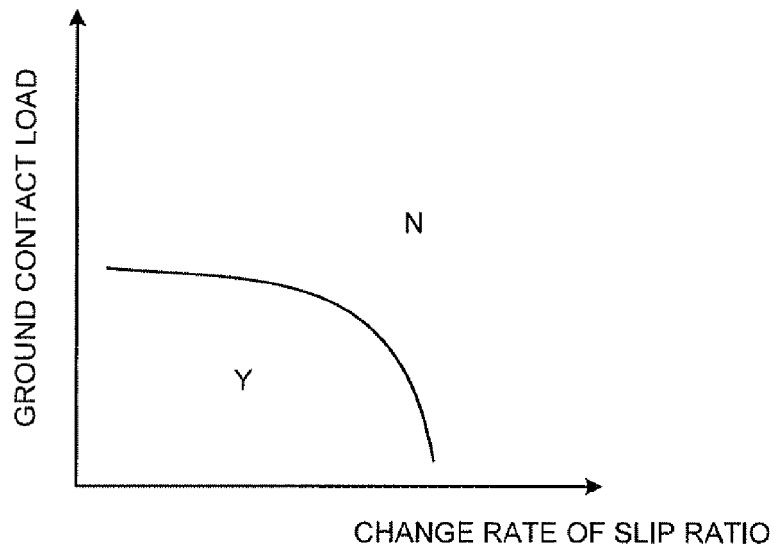
FIG. 9 is a determination map of a slip ratio stable region in the travel controlling apparatus of the vehicle of the third embodiment.
Figure 10:
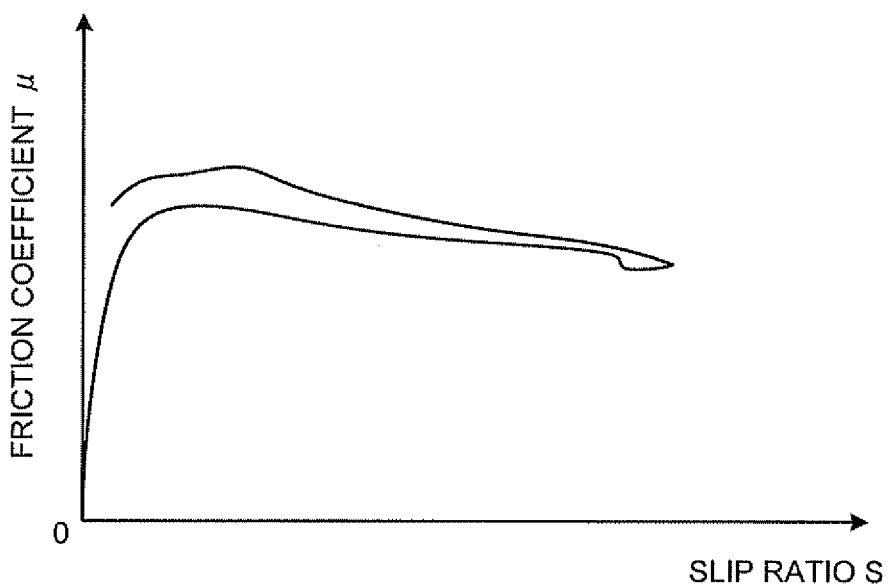
FIG. 10 is a graph showing a brake friction coefficient to a slip ratio.
Figure 11:
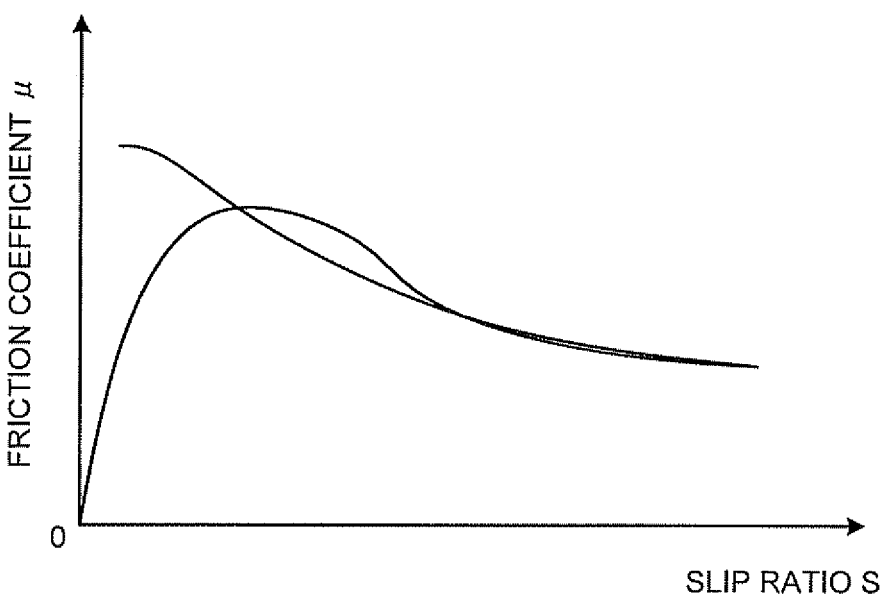
FIG. 11 is a graph showing a brake friction coefficient to a slip ratio.
Figure 12:
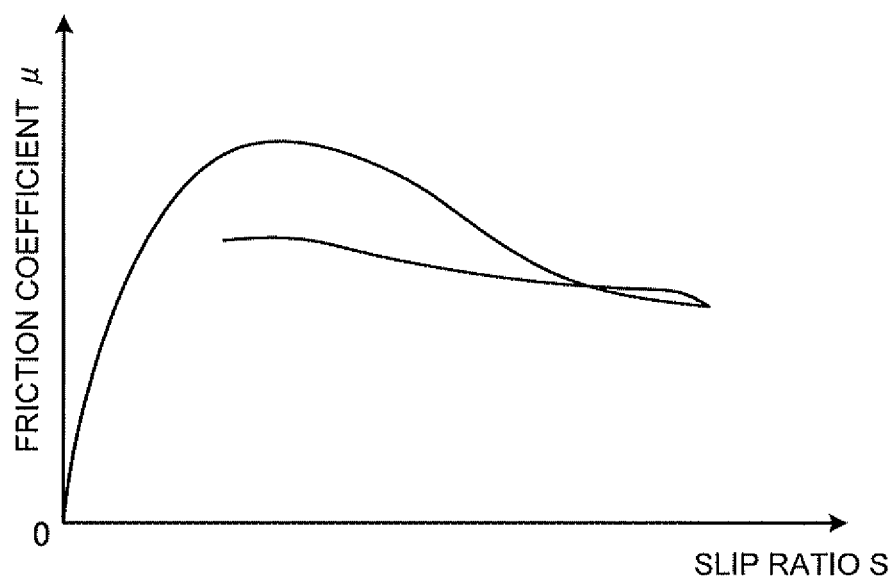
FIG. 12 is a graph showing a brake friction coefficient to a slip ratio.

FIG. 8 is a flowchart showing a brake control in a travel controlling apparatus of a vehicle according to a third embodiment of the present invention, FIG. 9 is a determination map of a slip ratio stable region in the travel controlling apparatus of the vehicle of the third embodiment, and FIG. 10 to FIG. 12 are graphs showing brake friction coefficients to slip ratios. Note that since an overall configuration of the travel controlling apparatus of the vehicle of the present embodiment is approximately the same as the first embodiment described above, the travel controlling apparatus is explained using FIG. 1 as well as components which have the same functions as the components explained in the embodiment are denoted by the same reference numerals and duplicate explanation is omitted.

As shown in FIG. 1, the travel controlling apparatus of the vehicle of the third embodiment includes a slip ratio detecting unit 31 which determines a slip ratio S between the front wheels 12FL, 12FR and the rear wheels 12RL, 12RR and a road surface depending on a travel state of the vehicle 11, a friction coefficient detecting unit 32 which determines a friction coefficient µ between the front wheels 12FL, 12FR and the rear wheels 12RL, 12RR and the road surface depending on the travel state of the vehicle 11, a slip ratio stable region setting unit 33 which sets a predetermined slip ratio stable region in which the friction coefficient µ becomes a preset predetermined value or more depending on the travel state of the vehicle 11, a braking/driving force controlling unit 34 which controls a braking/driving force in a set slip ratio stable region, and a slip ratio stable region changing unit 35 which changes at least any one of an upper limit value or a lower limit value in the slip ratio stable region depending on a variation of the friction coefficient when the slip ratio increases and when the slip ratio decreases.

In the third embodiment, the slip ratio stable region setting unit 33 employs a change rate (change speed) $S_s$ of a slip ratio S between the front wheels 12FL, 12FR and the rear wheels 12RL, 12RR and a road surface as a wheel input parameter detecting means which detects an input parameter acting on the front wheels 12FL, 12FR and the rear wheels 12RL, 12RR. In this case, the slip ratio S is calculated based on a travel speed V of the vehicle 11 detected by a vehicle speed sensor 18 and a wheel speed Vw of the front wheels 12FL, 12FR and the rear wheels 12RL, 12RR detected by wheel speed sensors 17FL, 17FR, 17RL, 17RR likewise the first embodiment, and an amount of change per unit time (second) in the slip ratio S is used as the change rate $S_s$ of the slip ratio S. That is, the slip ratio stable region setting unit 33 has a map showing many slip ratio-friction coefficient graphs (µ-S graphs) depending on the change rate $S_s$ of the slip ratio S, an optimum µ-S graph (map) is selected depending on the change rate $S_s$ of the slip ratio S when the vehicle 11 travels, and an upper limit value $S_1$ and a lower limit value $S_2$ are set in the slip ratio stable region.

Further, in the third embodiment, the slip ratio stable region changing unit 35 determines whether or not the upper limit value and the lower limit value in the slip ratio stable region are changed depending on the change rate $S_s$ of the slip ratio S as the input parameter acting on the front wheels 12FL, 12FR and the rear wheels 12RL, 12RR.

That is, in the characteristics of the slip ratio S and a friction coefficient µ to the change rate $S_s$ of the slip ratio S and a ground contact load Fz of the wheels, when the change rate $S_s$ of the slip ratio S is small and the ground contact load Fz is also small, as shown in FIG. 10, first, when the slip ratio S increases, the friction coefficient µ also increases and the friction coefficient µ decreases after it becomes a maximum value at a certain slip ratio S. Subsequently, when the slip ratio S decreases, the friction coefficient µ increases, and the friction coefficient µ decreases after it becomes a maximum value at a certain slip ratio S. In this case, the friction coefficient µ when the slip ratio S decreases becomes higher than the friction coefficient µ when the slip ratio S increases. Further, in the characteristics of the slip ratio S and the friction coefficient µ to the change rate $S_s$ of the slip ratio S and the ground contact load Fz of the wheels, when the change rate $S_s$ of the slip ratio S is slightly large and the ground contact load Fz is small, as shown in FIG. 11, a final portion of the friction coefficient µ when the slip ratio S decreases becomes higher than the friction coefficient µ when the slip ratio S increases. Further, in the characteristics of the slip ratio S and the friction coefficient µ to the change rate $S_s$ of the slip ratio S and the ground contact load Fz of the wheels, when the change rate $S_s$ of the slip ratio S is large and the ground contact load Fz is small, as shown in FIG. 12, the friction coefficient µ when the slip ratio S decreases becomes lower than the friction coefficient µ when the slip ratio S increases.

Note that, in the characteristics of the slip ratio S and the friction coefficient µ to the change rate $S_s$ of the slip ratio S and the ground contact load Fz of the wheels, even when the change rate $S_s$ of the slip ratio S is made constant and the ground contact load Fz is changed, the friction coefficient µ when the slip ratio S decreases varies up and down to the friction coefficient µ when the slip ratio S increases.

As described above, it can be found that when the change rate $S_s$ of the slip ratio S and the ground contact load Fz of the wheels change, the characteristics of the slip ratio S and the friction coefficient µ change. In this case, the characteristics of the slip ratio S and the friction coefficient µ mean a magnitude relationship between the friction coefficient µ when the slip ratio S increases and the friction coefficient µ when the slip ratio S decreases. In the present embodiment, as shown in FIG. 9, a region to the change rate $S_s$ of the slip ratio S and the ground contact load Fz is partitioned to two regions N, Y depending on the magnitude relationship between the friction coefficient µ when the slip ratio S increases and the friction coefficient µ when the slip ratio S decreases. That is, the region Y, in which the change rate $S_s$ of the slip ratio S is small as well as the ground contact load Fz is also small, is a region in which the friction coefficient µ when the slip ratio S increases is equal to or higher than the friction coefficient µ when the slip ratio S decreases. In contrast, the region N, in which the change rate $S_s$ of the slip ratio S is large or the ground contact load Fz is large, is a region in which the friction coefficient μ when the slip ratio S increases is lower than the friction coefficient μ when the slip ratio S decreases.

Accordingly, the characteristics of the slip ratio S and the friction coefficient μ are determined depending on the change rate $S_s$ of the slip ratio S and the ground contact load Fz as the wheel input parameter.

The brake control in the travel controlling apparatus of the vehicle of the third embodiment will be explained in detail based on the flowchart of FIG. 8.

In the brake control in the travel controlling apparatus of the vehicle of the third embodiment, as shown in FIG. 8, at step S41, an ECU 15 determines whether or not a driver performs a brake pedal depression operation. That is, the ECU 15 determines whether or not the driver depresses the brake pedal and the front wheels 12FL, 12FR and the rear wheels 12RL, 12RR are braked. When the ECU 15 determines that the driver does not perform the brake pedal depression operation, a process passes through the routine without performing anything.

In contrast, when the ECU 15 determines that the driver performs the brake pedal depression operation, the ground contact load Fz is estimated at step S42. As an estimating method, the ground contact load Fz is estimated from a weight of the front wheels 12FL, 12FR and the rear wheels 12RL, 12RR detected by wheel weight sensors 16F, 16R likewise the first embodiment. In this case, the ground contact load Fz is estimated in consideration of a load movement amount in a roll (lateral) direction and a load movement amount in an acceleration and deceleration (front/rear) direction in the vehicle 11. That is, the ground contact load Fz is estimated by adding a steering angle detected by a steering angle sensor 20, a front/rear acceleration detected by a front/rear acceleration sensor 21, and a lateral (right/left) acceleration detected by a lateral acceleration sensor 22 to vehicle design data. Subsequently, at step S43, the change rate $S_s$ of the slip ratio S is estimated. As an estimating method, the slip ratio S is calculated using the following expression based on the travel speed V of the vehicle 11 detected by the vehicle speed sensor 18 and the wheel speed Vw detected by the wheel speed sensors 17FL, 17FR, 17RL, 17RR likewise the first embodiment.

$$S=[(V-Vw)/V]\times 100$$

At step S44, a region to the change rate $S_s$ of the slip ratio S and the ground contact load Fz in the vehicle 11 which travels at present is determined based on a map shown in FIG. 9 using the ground contact load Fz and the change rate $S_s$ of the slip ratio S which are estimated. That is, the μ-S graph is set by determining whether the friction coefficient μ when the slip ratio S decreases is higher or lower than the friction coefficient μ when the slip ratio S increases just before the decrease of the slip ratio S. When it is determined that the region is a Y region, it is determined that the friction coefficient μ when the slip ratio S decreases is equal to or higher than the friction coefficient μ when the slip ratio S increases. In this case, at step S45, the ECU 15 continuously decreases a brake hydraulic pressure in hydraulic pressure brake devices 14FL, 14FR, 14RL, 14RR. That is, the lower limit value in the slip ratio stable region is changed to a decreasing side.

In contrast, when it is determined that the region is an N region at step S44, it is determined that the friction coefficient μ when the slip ratio S decreases is lower than the friction coefficient μ when the slip ratio S increases. In this case, the ECU 15 performs at step S46 a control in a set μ-S graph. That is, it is stopped to decrease the brake hydraulic pressure in the hydraulic pressure brake devices 14FL, 14FR, 14RL, 14RR in the lower limit value in the preset slip ratio stable region.

As described above, in the travel controlling apparatus of the vehicle of the third embodiment, the slip ratio stable region setting unit 33 employs the ground contact load Fz and the change rate $S_s$ of the slip ratio S as the wheel input parameter detecting means which detects the input parameter acting on the front wheels 12FL, 12FR and the rear wheels 12RL, 12RR and sets the regions N, Y depending on the ground contact load Fz and the change rate $S_s$ of the slip ratio 8, that is, sets an optimum slip ratio-friction coefficient graph, and sets the upper limit value and the lower limit value in the slip ratio stable region. Accordingly, the braking performance can be improved by applying an appropriate friction coefficient μ by setting the slip ratio stable region by setting the optimum slip ratio-friction coefficient graph to the travel state of the vehicle 11, that is, to the ground contact load Fz and the change rate $S_s$ of the slip ratio S which vary depending on a rotation state of the front wheels 12FL, 12FR and the rear wheels 12RL, 12RR.

Note that, in the respective embodiments described above, although the lower limit value in the slip ratio stable region is changed depending on the variation of the friction coefficient when the slip ratio increases and when the slip ratio decreases, the upper limit value in the slip ratio stable region may be changed.

Note that it is explained that the respective embodiments described above relate to a braking force control which is performed when a slip is generated at the time the hydraulic pressure brake devices 14FL, 14FR, 14RL, 14RR are operated by that the driver depresses the brake pedal, that is, when an ABS (antilock brake system) function is operated. However, the travel controlling apparatus of the vehicle according to the present invention is not limited to the braking force control and can be also applied to a driving force control. That is, the respective embodiments described above can be also applied to perform the driving force control when a slip is generated at the time the front wheels 12FL, 12FR and the rear wheels 12RL, 12RR are rotated idly by that the driver performs an accelerator depression operation, that is, when a TRC (traction control system) function is operated.

INDUSTRIAL APPLICABILITY

As described above, since the travel controlling apparatus of the vehicle of the present invention changes at least any one of the upper limit value or the lower limit value in the slip ratio stable region depending on the variation of the friction coefficient when the slip ratio increases and when the slip ratio decreases, safety can be improved by permitting a braking distance in the vehicle to be reduced, and the travel controlling apparatus of the vehicle can be preferably applied to any type of vehicles.

The invention claimed is:
1. A travel controlling apparatus of a vehicle comprising:
a slip ratio detecting unit that obtains a slip ratio of a wheel depending on a travel state of a vehicle;
a friction coefficient detecting unit that obtains a friction coefficient of the wheel depending on the travel state of the vehicle;
a slip ratio stable region setting unit that sets a predetermined slip ratio stable region in which the friction coefficient becomes a predetermined value or more depending on the travel state of the vehicle and which has an upper limit value and a lower limit value composed of a change of slip ratio-friction coefficient characteristics;

a braking/driving force controlling unit that controls a braking/driving force in the slip ratio stable region; and a slip ratio stable region changing unit that changes at least any one of an upper limit value or a lower limit value in the slip ratio stable region depending on a variation of the friction coefficient when the slip ratio increases and when the slip ratio decreases; wherein when the friction coefficient at the time the slip ratio decreases exceeds the friction coefficient at the time the slip ratio increases, the slip ratio stable region changing unit changes a lower limit value in the slip ratio stable region on a decreasing side.

2. The travel controlling apparatus of the vehicle according to claim 1, further comprising:

a wheel input parameter detecting unit that detects an input parameter acting on the wheel, wherein the upper limit value or the lower limit value in the slip ratio stable region is set depending on an input parameter of the wheel detected by the wheel input parameter detecting unit.

3. The travel controlling apparatus of the vehicle according to claim 2, wherein the wheel input parameter detecting unit detects a ground contact load, a vehicle speed, and a change rate of a slip ratio as the input parameter acting on the wheel.

4. The travel controlling apparatus of the vehicle according to claim 3, wherein the slip ratio stable region changing unit determines whether or not an upper limit value and a lower limit value in the slip ratio stable region are changed depending on an input parameter acting on the wheel.

5. The travel controlling apparatus of the vehicle according to claim 2, wherein the slip ratio stable region changing unit determines whether or not an upper limit value and a lower limit value in the slip ratio stable region are changed depending on an input parameter acting on the wheel.

6. The travel controlling apparatus of the vehicle according to claim 1, wherein when the friction coefficient at the time the slip ratio decreases exceeds the friction coefficient at the time the slip ratio increases, the slip ratio stable region changing unit changes a lower limit value in the slip ratio stable region to a preset corrected lower limit value.

7. The travel controlling apparatus of the vehicle according to claim 6, wherein the slip ratio stable region changing unit determines whether or not an upper limit value and a lower limit value in the slip ratio stable region are changed depending on an input parameter acting on the wheel.

8. The travel controlling apparatus of the vehicle according to claim 1, wherein when the friction coefficient at the time the slip ratio decreases exceeds the friction coefficient at the time the slip ratio increases, the slip ratio stable region changing unit changes a lower limit value in the slip ratio stable region to the slip ratio corresponding to a maximum value of the friction coefficient.

9. The travel controlling apparatus of the vehicle according to claim 8, wherein the slip ratio stable region changing unit determines whether or not an upper limit value and a lower limit value in the slip ratio stable region are changed depending on an input parameter acting on the wheel.

10. The travel controlling apparatus of the vehicle according to claim 1, wherein the slip ratio stable region changing unit determines whether or not an upper limit value and a lower limit value in the slip ratio stable region are changed depending on an input parameter acting on the wheel.

* * * * *